(12) United States Patent
Miller et al.

(10) Patent No.: US 9,474,215 B1
(45) Date of Patent: *Oct. 25, 2016

(54) METHOD AND COMPOSITION FOR AGRICULTURAL POTASSIUM FERTIGATION

(71) Applicants: John C. Miller, Fresno, CA (US); Deborah L. Miller, Fresno, CA (US)

(72) Inventors: John C. Miller, Fresno, CA (US); Deborah L. Miller, Fresno, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/833,484

(22) Filed: Aug. 24, 2015

Related U.S. Application Data

(63) Continuation-in-part of application No. 14/564,594, filed on Dec. 9, 2014, now Pat. No. 9,161,489.

(51) Int. Cl.
| | |
|---|---|
| *A01C 23/04* | (2006.01) |
| *C05D 1/00* | (2006.01) |
| *A01G 25/00* | (2006.01) |
| *C05F 11/00* | (2006.01) |
| *A01G 1/00* | (2006.01) |

(52) U.S. Cl.
CPC ............ *A01G 25/00* (2013.01); *A01C 23/042* (2013.01); *A01G 1/001* (2013.01); *C05D 1/00* (2013.01); *C05F 11/00* (2013.01)

(58) Field of Classification Search
CPC ................................ C05D 1/00; A01C 23/042
See application file for complete search history.

(56) References Cited

U.S. PATENT DOCUMENTS

| | | | | |
|---|---|---|---|---|
| 2,163,065 | A * | 6/1939 | Rosenstein | C05B 17/00 405/39 |
| 4,969,947 | A * | 11/1990 | Moore | C05G 3/0029 71/28 |
| 8,568,506 | B1 * | 10/2013 | Miller | C05B 7/00 239/727 |
| 8,821,646 | B1 * | 9/2014 | Miller | C11D 7/265 134/22.12 |
| 9,148,993 | B1 * | 10/2015 | Miller | A01C 23/042 |
| 9,161,489 | B1 * | 10/2015 | Miller | C05F 11/00 |

* cited by examiner

*Primary Examiner* — Wayne Langel
(74) *Attorney, Agent, or Firm* — Joan I. Norek; Law Office of Joan I. Norek

(57) ABSTRACT

An agricultural potassium-fertigation method for emitter-irrigation potassium fertigation feeds a potassium-nutrient feedstock comprised of potassium formate and water to an active emitter-irrigation system during one to all irrigation days during a crop cycle.

14 Claims, 3 Drawing Sheets

METHOD AND COMPOSITION FOR AGRICULTURAL POTASSIUM FERTIGATION

This application is a continuation in part of co-pending application Ser. No. 14/564,594 filed on Dec. 9, 2014, inventors Miller et al., for Method and Composition for Agricultural Potassium Fertigation.

BACKGROUND OF THE INVENTION

The present invention relates to fertilization wherein irrigation waters of agricultural irrigation systems contain fertilizer nutrients.

The agriculture industry adds fertilizers to the plant environs, such as the soil, to enhance crop growth and subsequent yields. Commercial fertilizers are usually selected of a variety of formulations depending on the crop and its nutrient requirements.

Fertilizers generally are classified according to their NPK content. NPK is common terminology used in the fertilizer industry and stands for: (1) N—the amount of nitrogen in the formulation as N; (2) P—the amount of phosphorus in the formulation as $P_2O_5$; and (3) K—the amount of potassium in the formulation as $K_2O$. Nitrogen, phosphorus and potassium are the basic plant nutrients or macronutrients that are taken up and utilized by the growing crops, and they are commonly provided or augmented by the addition of fertilizers (NPK fertilizers).

A fertilizer, as that term is used herein and as generally understood, refers to the nutrient-containing materials used to deliver fertilizer nutrients to a crop. Conventional fertilizers typically will contain materials that are extraneous to the crop's nutrient-uptake and soil condition ("yield-extraneous constituents") but which, for practical and/or other reasons, are necessary to the delivery of the nutrients. The process of delivering fertilizer nutrients to crops is referred to as fertilization.

The fertilization method of adding fertilizers to the water being used to irrigate the crops is called "fertigation", reflecting this combination of irrigation and fertilization. Fertigation reduces equipment, fuel and labor expended in the addition of fertilizers in comparison to mechanical delivery of fertilizers to the crop, and thus fertigation achieves a significant overall cost savings.

To conserve water, which is decreasing in availability and increasing in cost, current conventional technology includes micro-irrigation systems that deliver precise amounts of water directly to the soil holding the root system of the plant that is being grown. In the past twenty to thirty years, a large percentage of crop producers in the western and southwestern United States have converted from flood and sprinkler irrigation systems to micro-irrigation technology. Micro-irrigation systems contain devices called emitters, micro-sprinklers or other such devices that provide the precise amounts of water directly to the desired soil site, namely the soil holding the roots of the plant or crop being irrigated.

Micro-irrigation systems are sensitive to water quality and the inclusion of fertilizers and other additives stemming from the refinement of their micro components. These emitters, micro-sprinklers or other micro devices have very tiny orifices and/or a long tortuous narrow passageway that provide the requisite pressure for delivery of precise amounts of water in a uniform manner to each plant in the crop being irrigated so long as deposits do not build up inside them. Deposits from any source foul or plug these micro components. The smallest particle or foreign material can cause fouling of these devices. Water quality and the inclusion of fertilizers can, and frequently does, cause severe plugging problems. The problems arise from a number of factors: (1) the irrigation water is typically obtained from wells, reservoirs, canals, lakes, or rivers which contain various amounts of dissolved minerals; and (2) fertilizers can form insoluble salts and/or cause particulate formation when added to the water. Macro-irrigation systems (macro-sprinkler irrigation systems) mainly tolerate these conditions, while micro-irrigation systems are extremely intolerant.

In more detail, the addition of conventional fertilizer formulations to irrigation water normally increases the loading of inorganic salts over that already in the water. When the loading, or the combined loading, is too high, the solubilities of at least some of the naturally-occurring irrigation-water minerals and/or added compounds are exceeded and particulate formation increases dramatically. When particulates form, significant deposits begin to build up throughout the irrigation system. The end result for emitters or micro-sprinklers is plugging.

Plugging results in uneven distribution of water and nutrients to the crop being irrigated, and in some cases, the complete shut-down of the micro-irrigation system. Problem-free use of additives such as fertilizers in micro-irrigation systems is normally seen only in irrigation systems that use relatively pure water sources.

The conventional agricultural practice is to make intermittent or periodic applications of fertilizers. Such intermittent or discontinuous additions might be a single addition, or a plurality of additions, of large amounts (high concentrations) of fertilizer during a brief time interval each growing season or crop cycle. (The number of applications per growing season or crop cycle usually depends on the crop and/or the type of fertilizer being added.) When the fertilizer-delivery method is fertigation, fertilizers are typically slug fed into the irrigation system as quickly as possible to minimize the labor requirements and ease material handling. Slug feeding of a block (portion of a field) normally entails feeding the large amounts (high concentrations) of fertilizer to the irrigation water over a six to seven hour period during irrigation, and then, after the fertilizer feed is shut off, continuing the irrigation of that block for an additional two to three hours to rinse out all of the fertilizer that is contained inside the irrigation system, insuring that all of the fertilizer intended for the block is in fact delivered to the block. When an entire field is irrigated on a single day, slug feeding does not require a post-fertigation rinsing period.

Continuous fertigation methods, in which the irrigation water applied throughout a crop cycle, or during a prolonged period of a crop cycle, contains fertilizers, are known from U.S. Pat. No. 8,721,758, issued May 13, 2014, inventors Miller et al., the content of which is hereby incorporated by reference hereinto, and U.S. Pat. No. 8,986,417, issued Mar. 24, 2015, inventors Miller et al., the content of which is hereby incorporated by reference hereinto. Slug feeding fertigation methods are known from U.S. application Ser. No. 14/564,594, filed Dec. 9, 2014, inventors Miller et al., the content of which is hereby incorporated by reference hereinto.

The cost of commercial fertilizer formulations is, however, itself significant, and commercially viable fertilizer formulations (formulations sufficiently inexpensive for bulk agricultural use) typically include, as mentioned above, yield-extraneous constituents which do not contribute to plant nutrition or soil condition, and can even be undesirable components. Further, the bulk weight of commercial fertilizer formulations typically is water which increases the shipping costs. The water of a fertilizer formulation is analogous to, or at least approaches being, a yield-extraneous constituent because its contribution to the water requirements of a crop normally is negligible, particularly in comparison to its adverse impact on shipping, storage and handling but since water is normally required for an unimpeded container-to-irrigation-system fertilizer addition it is analogous to, but still not considered herein, a yield-extraneous constituent.

The terms "micro-irrigation" and "macro-irrigation" as used herein refer respectively to (1) micro-sprinklers, drip, and subsurface drip systems and (2) sprinkler systems without micro components which are primarily overhead sprinklers. The terms "overhead sprinkler" and "overhead sprinklers" as used herein refer to irrigation systems in which the irrigation water is emitted or sprayed from sprinkler heads, nozzles or other irrigation devices disposed at a position elevated from ground level, that normally (but not necessarily) are engaged directly above the crop being irrigated. Overhead sprinkler irrigation systems are normally macro-irrigation systems because micro-irrigation normally depend on a close proximity between the emitters and soil immediate the crop while overhead sprinklers are normally spaced apart from the soil immediate the crop. Such micro- and macro-irrigation systems are collectively referred to herein as "emitter-irrigation" systems because they each emit or eject sequential small quantities, or streams, of irrigation water from irrigation lines or tubes directed more or less towards the soil of crop being irrigated.

SUMMARY OF THE INVENTION

The present invention provides a method for emitter-irrigation potassium fertigation wherein a potassium-nutrient feedstock comprised of potassium formate and water is charged to an active emitter-irrigation system to form treated irrigation water, wherein the potassium-nutrient feedstock has a high or significant potassium-nutrient content, has a high or significant organic carbon content, has no essential yield-extraneous constituent such as sulfate and has no essential yield-adverse constituent, such as degradable thiosulfate or phosphate (when fed under phosphate-precipitation conditions) or chloride. The potassium-nutrient feedstock also has a minimal amount of water when the potassium-nutrient and organic carbon content is high, and its minimal water content drastically reduces shipping, storage and handling costs. The potassium-nutrient feedstock has no constituent that could aggravate the plugging potential of treated irrigation water.

The present invention also provides a potassium-nutrified fertigation water prepared according to at least one of the steps of the present potassium fertigation method.

DETAILED DESCRIPTION OF THE INVENTION

Figure 1:
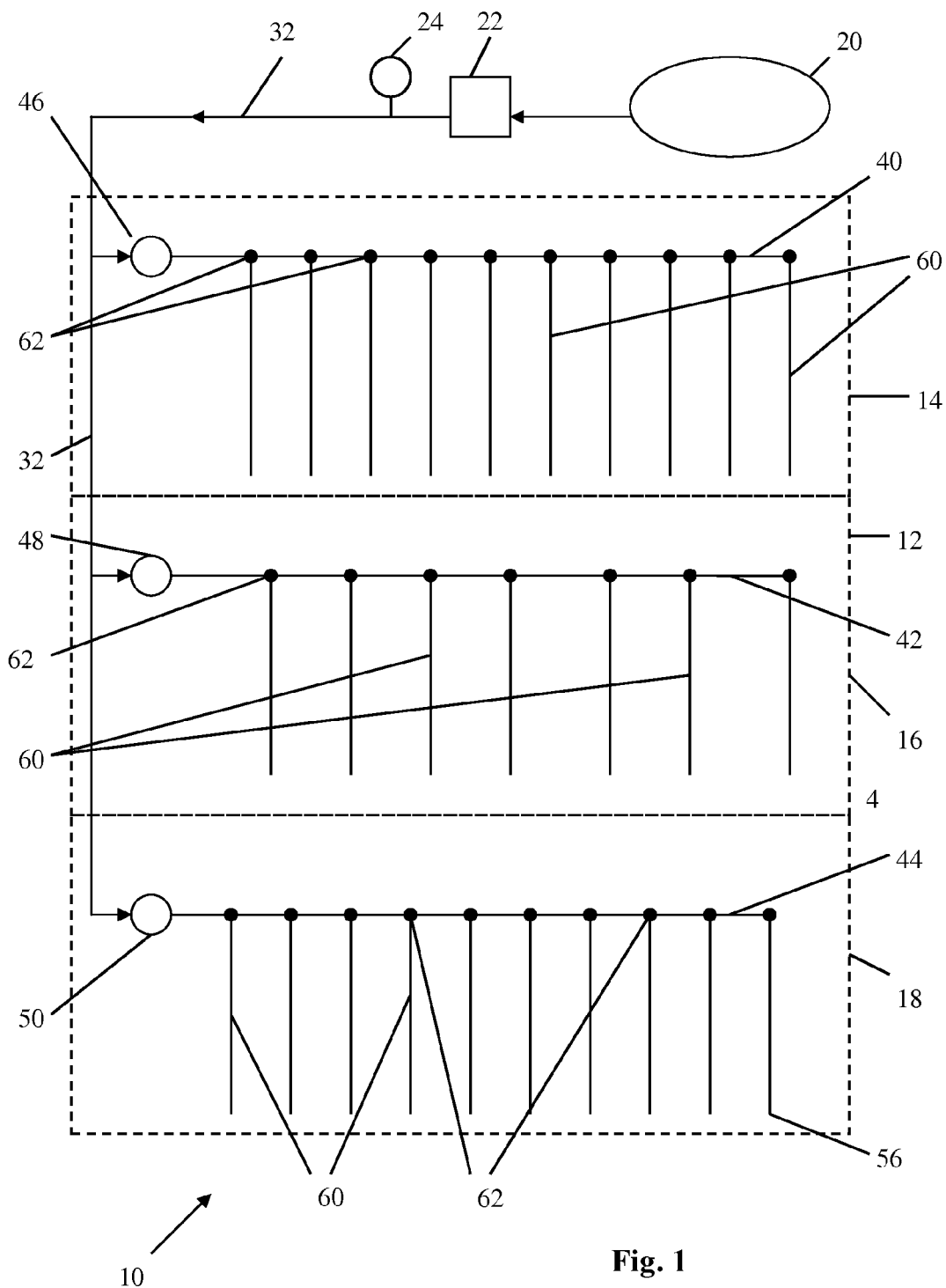
FIG. 1 is a schematic drawing of an irrigation system using the method of the present invention.

Potassium Fertigation:

The feeding of the potassium-nutrient feedstock to the irrigation water may be intermittent (slug-feeding), continuous, prolonged-term continuous or any other mode during a time or times when the irrigation system is active (at its full or normal operating pressure which is from about 10 to 150 psi depending on the system).

The Potassium-Nutrient Feedstock

The method of the present invention, namely the method for potassium fertigation by charging a potassium-nutrient feedstock comprised of potassium formate and water to the irrigation system, is drastically advantageous because the feedstock has a high or significant potassium-nutrient content, has a high or significant organic carbon content, has in some embodiments a minimal amount of water, has no essential yield-extraneous constituent such as sulfate, has no yield-adverse constituent such as degradable thiosulfate, phosphate (when fed under phosphate-precipitation conditions) or chloride, and the minimal water content of some embodiments drastically reduces shipping, storage and handling costs. It has no cations or anions (such as phosphate as mentioned above) that increase the deposit-forming load of the irrigation water to which it is fed. Such anions or cations, and other adverse constituents such as degradable thiosulfate, are typically present in commercial fertilizers because they are needed for the delivery of the nutrient or for other reasons tied to the respected formulation; in other words, such anions, cations and the like, when they are present because they are needed, are essential yield-adverse constituents with respect to those formulations.

At concentration levels of potassium formate of from 5 to 75 wt. percent, the feedstock of the present invention ranges from a 0-0-3 NPK fertilizer to a 0-0-42 NPK fertilizer. At the preferred concentration levels of potassium formate of from 50 to 75 wt. percent, the feedstock ranges from a 0-0-28 NPK fertilizer to a 0-0-42 NPK fertilizer. In more preferred embodiments, the concentration level of potassium formate in the feedstock is from 65 to 75 wt. percent, and therefore the feedstock ranges from about a 0-0-36 NPK fertilizer to a 0-0-42 NPK fertilizer.

Further, in preferred embodiments, the potassium-nutrient feedstock is charged to the irrigation system at levels sufficient to provide a concentration of from 1.0 to 30,000 ppm of potassium as K2O in said treated irrigation water, and more preferably from 5 to 10,000 ppm of potassium as K2O in said treated irrigation water.

Further, the potassium-nutrient feedstock is preferably charged to the irrigation system at an addition rate of from 0.001 to 50 gal./min., and in other preferred embodiments, the potassium-nutrient feedstock is charged to the irrigation system at an addition rate of from 0.01 to 20 gal./min., and in other embodiments preferably at an addition rate of from 0.001 to 50 gal./1,000 gal. irrigation water, and more preferably at an addition rate of from 0.01 to 20 gal. 1,000 gal. irrigation water.

In contrast, the most basic (simple) sources of potassium used in conventional agricultural fertigation are potassium sulfate and potassium thiosulfate. Potassium sulfate is soluble only up to 5% potassium as K2O (a 0-0-8 NPK fertilizer), requiring huge costs for (a) the shipment and storage of this dilute fertilizer and (b) the time and labor required to slug-feed such a dilute material to an irrigation system. Potassium thiosulfate (a 0-0-25 NPK fertilizer) has a higher solubility than potassium sulfate (but still far lower than the present invention's more preferred 0-0-36 NPK to 0-0-42 NPK feedstock) but it is expensive and, since the sulfur of thiosulfate is not in its highest oxidation state, it is at risk of decomposition and precipitation, which leads to fouling of the irrigation system and impaired irrigation. (No oxidants, such as chlorine, can be used in the irrigation system at or about the same time as potassium thiosulfate.) Potassium nitrate, another potassium source, is very soluble itself but (a) it does not provide a high concentration of potassium in solution, (b) its distribution is restricted or prohibited by laws and/or regulations because of security risks associated with its nitrate content and (c) it is prohibitively expensive. Potassium phosphate, another highly soluble potassium source, is also much too expensive for conventional fertigation practices and the phosphate can, under some conditions, cause precipitation and fouling problems.

The present invention does not exclude sequential and/or concomitant addition of other materials if desired, including but not limited to one or more other fertilizers and the like. In preferred embodiments, particularly with respect to micro-irrigation systems, concomitant addition of other materials is limited to materials having molecular weights that do not exceed 1,000 as charged or as developed within the irrigation system.

The potassium-nutrient feedstock is charged to an irrigation system by feeding it to the irrigation water flowing through a main line of an irrigation system (that is, directly charging to a main line of an irrigation system) downstream of any irrigation-system filters and upstream of the delivery points of the irrigation system.

The method of emitter-irrigation fertigation of the present invention is carried out at an agricultural field that irrigated as an entirety when irrigation is conducted or is irrigated in sections or portions referred to as blocks. Every emitter-irrigated agricultural field is comprised of blocks, which are either a single block when the field is irrigated as an entirety or a plurality (two or more) of blocks. Referring to FIG. 1, there is shown a schematic illustration of an emitter irrigation system, which can be either a micro-irrigation system or a stationary overhead irrigation system, which is designated by the general reference number 10. The irrigation system 10 provides irrigation water to the grower's field 12, shown in phantom in FIG. 1. Upstream of the field 12 is a source of irrigation water (reservoir 20) and an irrigation pump 22 (irrigation pumping station) which pumps irrigation water from the water source 20 through the main line 32. The field 12 is comprised of three portions or blocks, namely a first block 14, a second block 16 and a third block 18, each of which is shown in phantom in FIG. 1. Each block is serviced by a lateral irrigation line, namely a first lateral line 40, a second lateral line 42 and a third lateral line 44. Irrigation water flow to each lateral line 40, 42, 44 is controlled by a shut-off valve, namely a first shut-off valve 46, a second shut-off valve 48 and a third shut-off valve 50, each neighboring the intersection of the respective lateral line with the main irrigation line 32. Under normal operating conditions, only one of the shut-off valves 46, 48, 50 would be open, and only one of the blocks 14, 16, 18 would be undergoing irrigation, at any given time. Each block has a plurality of irrigation lines 60 branching of the respective lateral line and stretching out along the crops (not shown) in the respective block. Each irrigation line 60 has a plurality of emitters (not shown) at which irrigation water is delivered to the crops. At the intersection of each irrigation line 60 and the respective lateral line from which it stems is a riser 62. Each riser 62 is a small shut-off valve permitting the halting of water flow to its respective irrigation line 60 without curtailing water flow to the remaining irrigation lines 60 in the respective block. Downstream of pump 22, and upstream of the field 12 (and of course upstream of each of the blocks 14, 16, 18 which comprise the field 12) is a feed station 24 at which the feedstock is fed to the irrigation water, converting the irrigation water into treated irrigation water.

Figure 2:
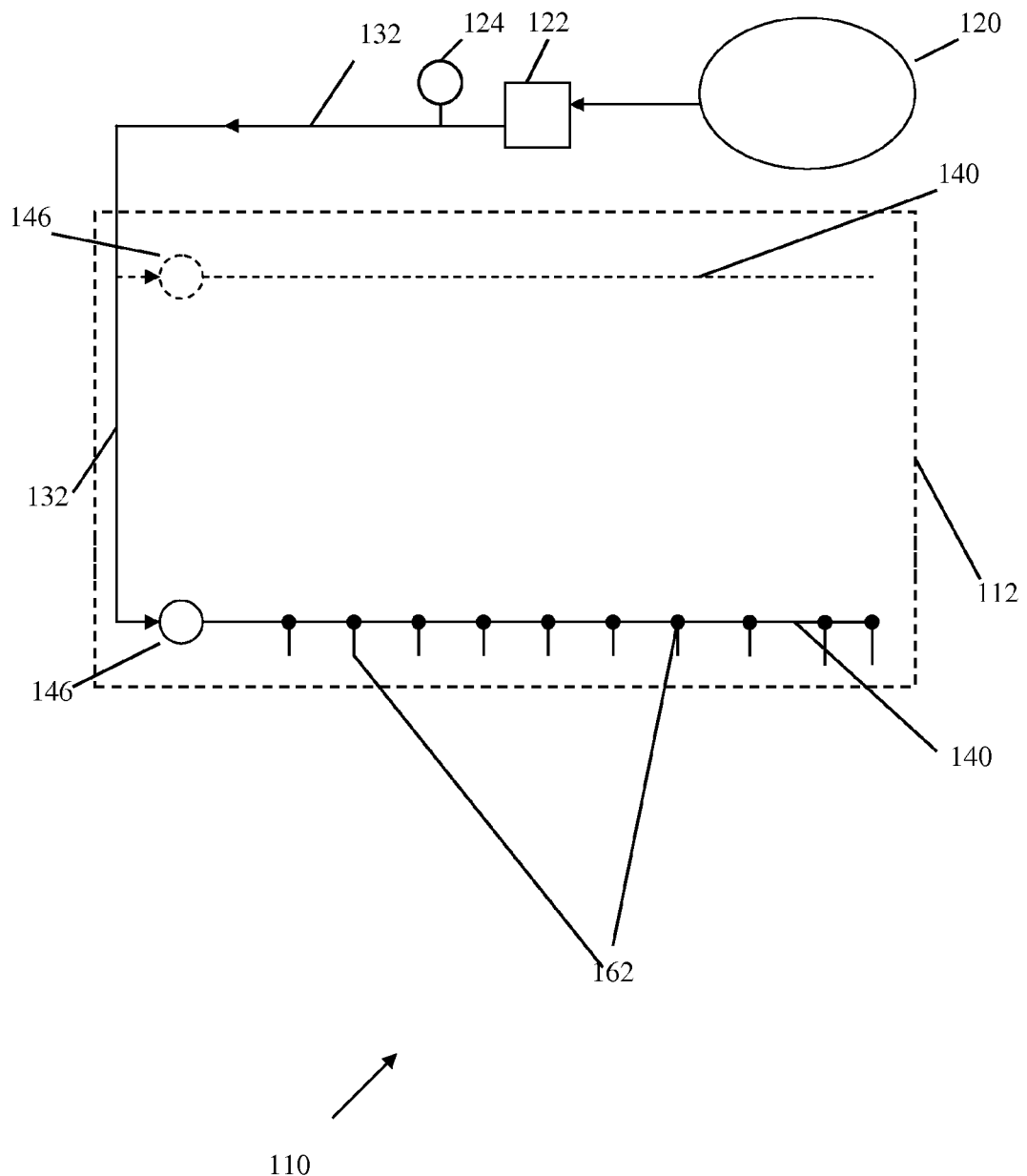
FIG. 2 is a schematic drawing of an irrigation system using the method of the present invention.

Referring to FIG. 2, there is shown a schematic illustration of an emitter irrigation system, which in this instance is a mobile overhead emitter irrigation system, and which is designated by the general reference number 110. The irrigation system 110 provides irrigation water to the grower's field 112 (shown in phantom in FIG. 2). Upstream of the field 112 is a source of irrigation water (reservoir 120) and an irrigation pump 122 (irrigation pumping station) which pumps irrigation water from the reservoir 120 through a flexible main line 132. This field 112 is serviced by a mobile elevated lateral irrigation line 140. Irrigation water flow to lateral line 140 is provided through a line connector 146 at an end of lateral line 140 which accepts a connection with the flexible main irrigation line 132. The flexible main irrigation line 132 preferably has a shut-off valve (not shown). The mobile lateral line 140 has a plurality of emitters 162 (irrigation delivery points) at which irrigation water is delivered to the crops. Ten emitters 162 are shown in FIG. 2 for simplicity and in actuality a typical mobile lateral line would have dozens of emitters. The mobile lateral line 140 rolls from position to position along the field 112, for instance from the position far out in the field 112 shown to a near position shown in phantom (in which the emitters 162 are not shown for simplicity), delivering treated irrigation water to the crops (not shown) at each position. Downstream of pump 122 and upstream of the field 112 is a feed station 124 at which the feedstock is fed to the irrigation water, converting the irrigation water into treated irrigation water.

Figure 3:
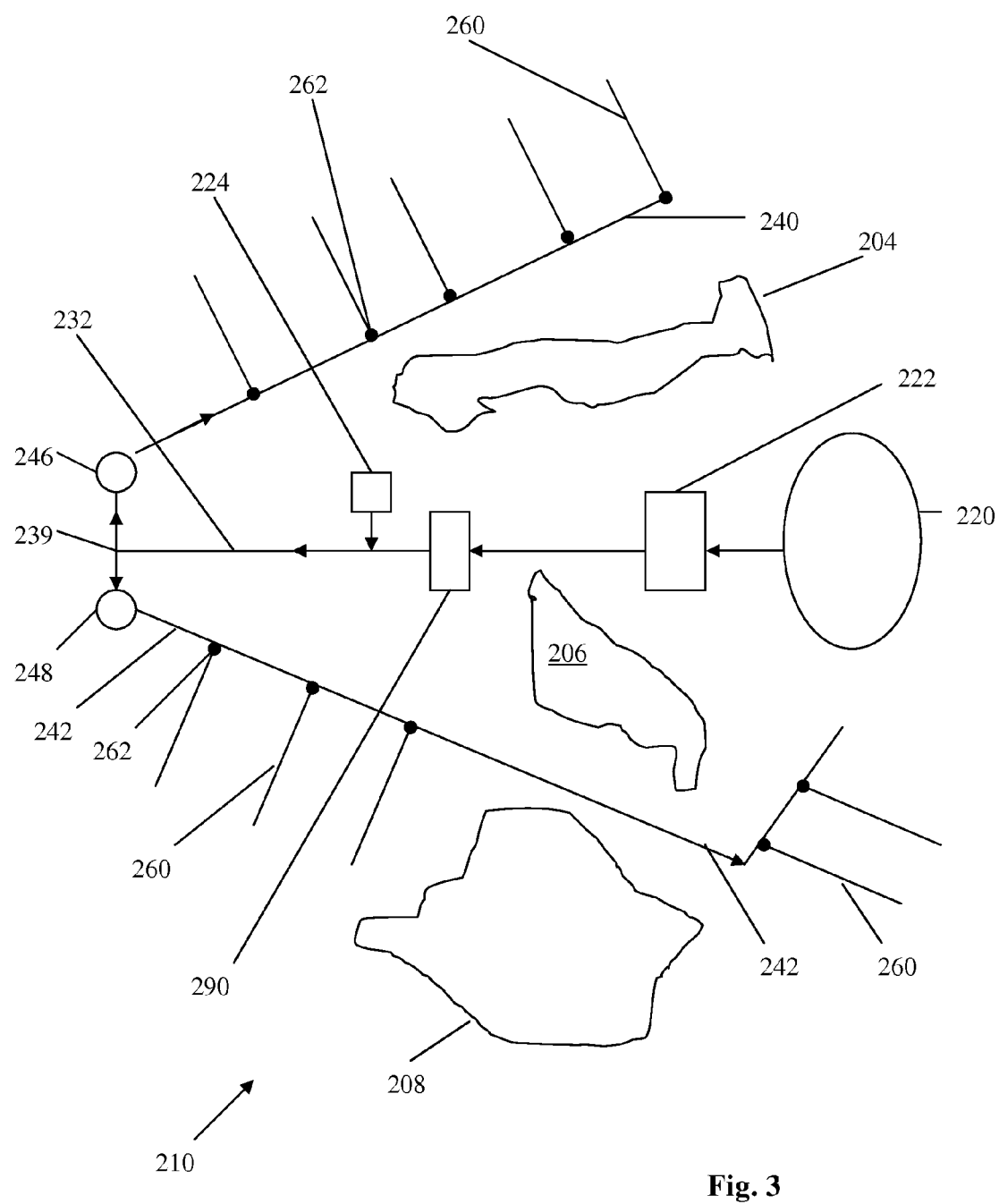
FIG. 3 is a schematic drawing of an irrigation system using the method of the present invention.

Referring to FIG. 3, there is shown a schematic illustration of an emitter irrigation system designated by the general reference number 210. The irrigation system 210 provides irrigation water to the field under cultivation laid out among hills 204, 206, 208 which themselves are not under cultivation. The source of irrigation water 220 is flanked by hills 204, 206. Irrigation water is drawn from the irrigation water source 220 by a plurality of pumps (not shown) of an irrigation pumping station 222 into a main line 232. The main line 232 branches into two lateral lines, namely the first lateral line 240 and the second lateral line 242. Irrigation water flows to the first and second lateral lines 240, 242 are controlled respectively by the first and second shut-off valves 246, 248, each neighboring the intersection 239 of the lateral lines 240, 242 with the main irrigation line 232. There is a branching of the main line 232 at intersection 239. Each lateral line has a plurality of irrigation lines 260 branching off and stretching out along the crops (not shown). Each irrigation line 260 has a plurality of irrigation delivery points (not shown) at which irrigation water is delivered to the crops. At the intersection of each irrigation line 260 and the respective lateral line from which it stems is a riser 262 (small shut-off valve) permitting the halting of water flow to its respective irrigation line 260. A feedstock delivery system 224 is installed downstream of the irrigation pump 222, and downstream of a filter 290 which filters solid debris out of the irrigation water flowing through the main water line 232.

Demonstrative Example 1

The method of the present invention was assessed for use at a 150 acre vineyard having an eight-month crop cycle (February 1 through September 30), a micro-irrigation system, an irrigation water usage of 1.0 ac-ft/acre during the first five months and 1.0 ac-ft/acre during the last three months and an irrigation water flow rate of 1,000 gal./min. The source of potassium is a potassium-nutrient feedstock of the present invention, which in this instance is a 75 wt. % aqueous solution of potassium formate (a nonconventional 0-0-42 NPK fertilizer), which is slug-fed to the irrigation water during an eight-hour irrigation day on each of March 1, June 15 and September 15 in the respective amounts of 15 lbs./acre potassium (as K2O), 10 lbs./acre potassium (as K2O) and 15 lbs./acre potassium (as K2O), which provides a total amount of 40 lbs./acre potassium (as K2O) during the crop cycle. The level of potassium (as K2O) fed to the irrigation water during each eight-hour slug feeding was 2,250 lb., 1,500 lb. and 2,250 lb. respectively which provided a level of potassium (as K2O) in the total 480,000 gallons of treated irrigation water of 564 ppm, 376 ppm and 564 ppm respectively. The feed rates of the potassium-nutrient feedstock were about 0.85 gallons/min., 0.57 gallons/min. and 0.85 gallons/min., or with respect to the volume of irrigation water, 0.85, 0.57 and 0.85 gallons feedstock per 1,000 gallons of irrigation water. In addition to delivering 40 lb./acre potassium (as K2O) during the crop cycle, this slug-fed potassium fertigation delivers 38 lb./acre of organic formate and no yield-extraneous material.

Demonstrative Example 2

The method of Example 1 is repeated except that the three slug feedings of the 75 wt. % aqueous solution of potassium formate are in the amounts of respectively 16 lbs./acre potassium (as K2O), 8 lbs./acre potassium (as K2O) and 16 lbs./acre potassium (as K2O), which provided a level of potassium (as K2O) in the treated irrigation water of 602 ppm, 301 ppm and 602 ppm respectively. The feed rates of the potassium-nutrient feedstock were about 0.92, 0.46 and 0.92 gallons/min., or gallons/1,000 irrigation-water gallons.

Demonstrative Example 3

The method of Example 1 is repeated except that the three slug feedings of the 75 wt. % aqueous solution of potassium formate are each in the amount of 13.67 lbs./acre potassium (as K2O), which provided a level of potassium (as K2O) in the treated irrigation water of 507 ppm. The feed rate of the potassium-nutrient feedstock was 0.77 gallons/min. or 0.77 gallons/1,000 irrigation-water gallons during each slug feed.

Demonstrative Example 4

The method of the present invention was assessed for use at a 150 acre almond ranch which uses an micro-irrigation system and which has a nutrient requirement of 175 lbs./acre potassium (as K2O) and receives a total of four acre-feet of irrigation water over its eight-month (March 1 to October 31) growing season (crop cycle) at a flow rate of 1,000 gallons/min. The source of potassium is a potassium-nutrient feedstock of the present invention, which in this instance is a 75 wt. % aqueous solution of potassium formate (a nonconventional 0-0-42 NPK fertilizer), which is slug-fed to the irrigation water during a normal nine-hour irrigation day on each of March 15 and September 30 in the respective amounts of 100 lbs./acre (as K2O) and 75 lbs./acre potassium (as K2O). The level of potassium (as K2O) in the treated irrigation water during the potassium fertigations (which is about 540,000 gallons or 4,500,000 lb. of irrigation water) is respectively about 3,340 ppm and 2,505 ppm. The weight of the potassium-nutrient feedstock itself charged during the two potassium fertigations is respectively about 35,714 lb. and 26,786 lb. and, given a density of about 13.02 lb./gallon, the volume of the potassium-nutrient feedstock charged during the potassium-nutrient fertigations is respectively about 2,743 gallons and 2,057 gallons. The feed-rates of the potassium-nutrient feedstock during the two potassium fertigations are respectively about 5.1 gallons and 3.8 gallons per minute (or per 1,000 gallons of irrigation water). A total of about 4,800 gallons (about 62,496 lb.) of the 75 wt. % potassium formate solution must be shipped, stored and then slug fed to the irrigation system in this embodiment of the present invention. In addition to delivering 175 lb./acre potassium (as K2O) during the crop cycle, this slug-fed potassium fertigation delivers 168.7 ck this lb./acre of organic formate and no yield-extraneous material.

Demonstrative Comparative Example A

The method of Example 4 was repeated except that an aqueous solution of potassium thiosulfate (a conventional 0-0-25 NPK fertilizer) was used instead of the potassium-nutrient feedstock of the present invention. The potassium thiosulfate was slug-fed to the irrigation water during the normal nine-hour irrigation day on March 15 and September 30 in the same respective amounts of 100 lbs./acre and 75 lbs./acre potassium (as K2O). The potassium thiosulfate solution has a density of 12.64 lbs./gallon, and there to provide these levels of potassium (as K2O), the volume of potassium thiosulfate solution charged to the irrigation water during the two fertigations is respectively 4,747 gal. (60,000 lb.) and 3,560 gal. (45,000 lb.), which require feed-rates of respectively 8.8 and 6.6 gallons/minute (per 1,000 gallons irrigation water). Therefore a total of 8,307 gallons (105,000 lb.) of the potassium thiosulfate solution must be slug fed to the irrigation water. No other fertilizers can be slug-fed simultaneously with this high level of thiosulfate because of incompatibilities, there is the risk of thiosulfate decomposition and precipitation even when slug-fed alone. Further, the soil receives no organic material and the thiosulfate delivered to the soil is a yield-adverse constituent.

Demonstrative Comparative Example B

The method of Example 4 is repeated except that a 9.25 wt. % aqueous solution of potassium sulfate (a conventional 0-0-5 NPK fertilizer) was used instead of the potassium-nutrient feedstock of the present invention. To provide the same potassium fertigation levels, namely feeding of 175 lbs./acre potassium (as K2O) during the crop cycle in two slug feedings, the amount of potassium sulfate solution that must be slug fed is about 525,000 lb. which is about 59,288 gallons and further the soil receives no organic material and the sulfate delivered to the soil is primarily a yield-extraneous constituent.

Demonstrative Example 5

The method of the present invention was assessed for use for a ranch using a micro-irrigation system and having 500 acres of almonds under cultivation. This ranch as an eight-month (March 1 through October 31) irrigation period for this crop. The irrigations (and therefore the fertigations) are conducted in a five-day series in which one block or section of the five sections total is irrigation on a given day, and then the next block on the following day, and the like until the entire 500 acres receives a day of potassium fertigation ("per-block irrigation series"). The source of potassium is a potassium-nutrient feedstock of the present invention, which in this instance is a 75 wt. % aqueous solution of potassium formate (a nonconventional 0-0-42 NPK fertilizer), which is slug-fed to the irrigation water during the first six hours of a normal seven-hour irrigation day starting each of the slug-feeding series on March 15, May 1, June 15 and October 31 in the respective amounts of 83.3 lbs./acre potassium (as K2O), 16.7 lbs./acre potassium (as K2O), 25 lbs./acre potassium (as K2O) and 55 lbs./acre potassium (as K2O), which provides a total amount of 180 lbs./acre potassium (as K2O) during the crop cycle. The level of potassium (as K2O) fed to the irrigation water during the six-hour slug feedings of each five-day series was respectively 8,330 lb., 1,670 lb., 2,500 lb. and 5,500 lb. which, at an irrigation water flow rate of 1,000 gallon/min. (about 3,000,000 lb. during the 6 hours of each of five days) provided a level of potassium (as K2O) in the treated irrigation water of about 2,782 ppm potassium (as K2O), 558 ppm potassium (as K2O), 835 ppm potassium (as K2O) and 1,837 ppm potassium (as K2O) respectively. The feed rates of the potassium-nutrient feedstock were respectively about 4.2 gal./min., 0.8 gal./min., 1.3 gal./min. and 2.8 gal./min. In addition to delivering 180 lb./acre potassium (as K2O) during the crop cycle, this prolonged-term continuous potassium fertigation delivers 174 lb./acre of organic formate and no yield-extraneous material.

Demonstrative Example 6

The method of the present invention was assessed for use at a 150 acre almond ranch which will normally receive a total of four acre-feet of irrigation water over its eight-month (March 1 to October 31) growing season, delivered as follows: (a) 1.0 acre-foot during the first three months (March 1 through June 1); 2.5 acre-feet during the second three months (June 1 through September 1); and 0.5 acre-foot during the last two months (September 1 through November 1). The source of potassium is a potassium-nutrient feedstock of the present invention, which in this instance is a 75 wt. % aqueous solution of potassium formate (a nonconventional 0-0-42 NPK fertilizer), continuously added with the irrigation water in the amount of 50 lb/acre potassium (as K2O) over the March, April and May three-month time interval period, 25 lb/acre over the June, July and August three-month time period, and 50 lb/acre over the September and October two-month time period. In addition to delivering 125 lb./acre potassium (as K2O) during the crop cycle, this prolonged-term continuous irrigation delivers 121 lb./acre of organic formate and no yield-extraneous material.

Demonstrative Comparative Example C

In comparison to Demonstrative Example 6, if the source of potassium used is potassium thiosulfate (K2S2O3) fed to the irrigation system as a 25 wt. percent aqueous solution (a conventional 0-0-25 NPK fertilizer), the soil receives no organic material and the soil receives a significant amount of yield-extraneous material.

Demonstrative Comparative Example D

In comparison to Example 6, if the source of potassium used is potassium sulfate (K2SO4) fed to the irrigation system as an 9.25 wt. percent aqueous solution (a conventional 0-0-5 NPK fertilizer), the soil receives no organic material and the soil receives a significant amount of yield-extraneous material.

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

We claim:

1. A method of emitter-irrigation potassium fertigation of an agricultural field, said agricultural field being irrigated by means of an active emitter-irrigation system having a stream of flowing irrigation water upstream of said agricultural field, said method comprising the steps of:
   (step 1) converting said irrigation water to treated irrigation water by charging a potassium-nutrient feedstock to said stream of said flowing irrigation water upstream of said agricultural field whereby said irrigation water is converted to treated irrigation water, wherein said potassium-nutrient feedstock is comprised of potassium formate and water;
   (step 2) irrigating said agricultural field with said treated irrigation water; and
   (step 3) repeating step 1 and step 2 on 0 to all irrigation days over a crop cycle.

2. The method of emitter-irrigation potassium fertigation of an agricultural field according to claim 1 wherein said potassium-nutrient feedstock is a 50 to 75 wt. percent aqueous solution of potassium formate.

3. The method of emitter-irrigation potassium fertigation of an agricultural field according to claim 1 wherein said potassium-nutrient feedstock is a 65 to 75 wt. percent aqueous solution of potassium formate.

4. The method of emitter-irrigation potassium fertigation of an agricultural field according to claim 1 wherein said emitter-irrigation system is a micro-irrigation system.

5. The method of emitter-irrigation potassium fertigation of an agricultural field according to claim 1 wherein said emitter-irrigation system is an overhead sprinkler system.

6. The method of emitter-irrigation potassium fertigation of an agricultural field according to claim 1 wherein, in step 1, said potassium-nutrient feedstock is charged at a rate of 0.001 to 50 gal./min.

7. The method of emitter-irrigation potassium fertigation of an agricultural field according to claim 1 wherein, in step 1, said potassium-nutrient feedstock is charged at a rate of 0.1 to 20 gal./min.

8. The method of emitter-irrigation potassium fertigation of an agricultural field according to claim 1 wherein, in step 1, said charging of said potassium-nutrient feedstock provides a concentration of from 1 to 30,000 ppm of potassium as K2O in said treated irrigation water.

9. The method of emitter-irrigation potassium fertigation of an agricultural field according to claim 1 wherein, in step 1, said charging of said potassium-nutrient feedstock provides a concentration of from 5 to 10,000 ppm of potassium as K2O in said treated irrigation water.

10. The method of emitter-irrigation potassium fertigation of an agricultural field according to claim 1 wherein, in step 1, said potassium-nutrient feedstock is charged at a rate of 0.001 to 50 gal./1,000 gal. irrigation water.

11. The method of emitter-irrigation potassium fertigation of an agricultural field according to claim 1 wherein, in step 1, said potassium-nutrient feedstock is charged at a rate of 0.1 to 20 gal./1,000 gal. irrigation water.

12. The method of emitter-irrigation potassium fertigation of an agricultural field according to claim 1 wherein, in step 1, said potassium-nutrient feedstock is charged at a rate of 0.1 to 20 gal./min. and said charging of said potassium-nutrient feedstock provides a concentration of from 5 to 10,000 ppm of potassium as K2O in said treated irrigation water.

13. A treated agricultural potassium-fertigation water comprising:
    agricultural irrigation water; and
    potassium formate at a concentration of from 1 to 30,000 ppm potassium as K2O, prepared according to step 1 of the method of claim 1.

14. A treated agricultural potassium-fertigation water according to claim 13 wherein said concentration of said potassium formate is from 5 to 10,000 ppm potassium as K2O.

\* \* \* \* \*